United States Patent [19]
Hattori et al.

[11] 4,066,338
[45] Jan. 3, 1978

[54] ELECTROOPTIC LIGHT MODULATOR

[75] Inventors: Shuzo Hattori; Tadao Hiramatsu, both of Nagoya; Sunao Katayama, Aichi; Hidenori Ozawa; Yasuyuki Hiraiwa, both of Nagoya, all of Japan

[73] Assignee: Hagiwara Denki Kabusiki Kaisha, Nagoya, Japan

[21] Appl. No.: 677,718

[22] Filed: Apr. 16, 1976

[30] Foreign Application Priority Data

Apr. 22, 1975 Japan .................................. 50-48940

[51] Int. Cl.² ............................................. G02F 1/16
[52] U.S. Cl. ............................................. 350/161 W
[58] Field of Search .................... 350/96 WG, 161 W; 332/7.51; 331/94.5 M

[56] References Cited

U.S. PATENT DOCUMENTS 3,887,885   6/1975   Hattori ............................. 350/160 R Primary Examiner—William L. Sikes
Attorney, Agent, or Firm—Berman, Aisenberg & Platt

[57] ABSTRACT

An electrooptic light modulator comprises a parallelepiped substrate having an electrooptic property and a set of interdigital electrodes provided on the upper surface of the substrate to cause in the substrate and subjacent the upper surface an electrostatic field in accordance with a modulating signal voltage applied thereto, at least one of the lower surface and the side surfaces of the substrate being non-parallel to the opposing surface thereto to prevent acoustic waves resonance produced in the substrate by the electrostatic field.

13 Claims, 15 Drawing Figures

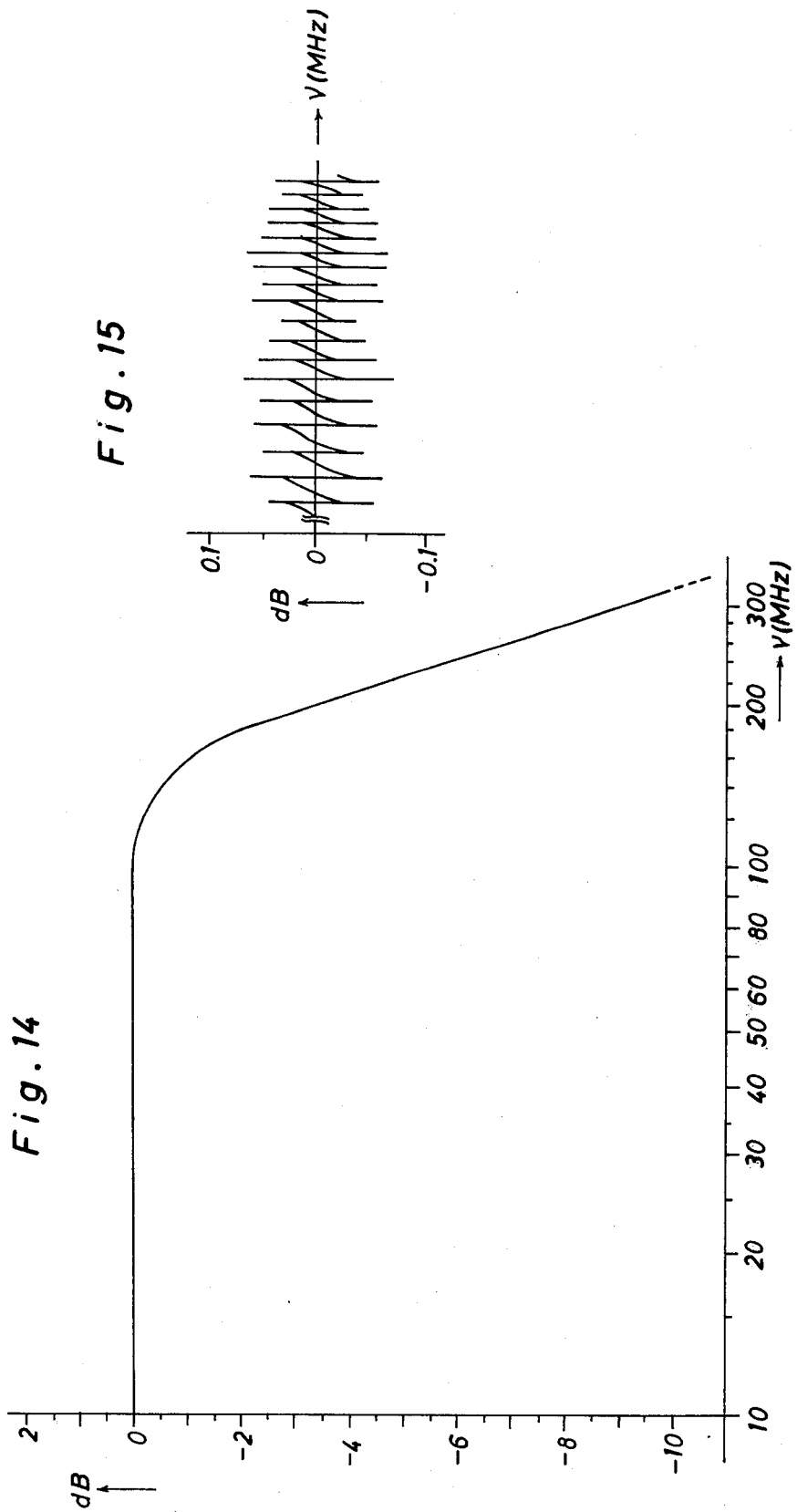

ELECTROOPTIC LIGHT MODULATOR

BACKGROUND OF THE INVENTION

1. Field of the Invention

The present invention relates to electrooptic light modulators, and more particularly to electrooptic light modulators of the type in which a set of interdigital electrodes is provided on a plane surface of a parallelepiped electrooptic crystal or on a light transmissible thin-film deposited on a plane surface of a parallelepiped substrate to produce an electrostatic field subjacent the electrode-bearing surface.

2. Description of the Prior Art

The aforementioned electrooptic light modulators are explained in the following description of the prior art with reference to the accompanying drawings, in which:

FIG. 1 shows an electrooptic light modulator including a parallelepiped electrooptic crystal 10 which is provided, on a surface in the Y - Z plane, with a set of interdigital electrodes 11 and 12 extending in the Y-direction and spaced apart from one to another in the Z-direction;

FIG. 2 shows an electrooptic light modulator including a light waveguide of an electrooptic crystalline composite structure which comprises a parallelepiped substrate 14, a light transmissible thin-film 13 deposited on a plane surface of the substrate 14, and a set of interdigital electrodes 11 and 12 provided on the thin-film 13; and FIG. 3 shows a modification of the electrooptic light modulator of FIG. 1, wherein a single pair of electrodes 11 and 12 are provided on a surface in the Y - Z plane of an electrooptic crystal 10.

Each of the electrooptic crystals shown in FIGS. 1 and 3 has a pair of parallel upper and lower surfaces respectively defined by the Y and Z axes, a pair of parallel side surfaces respectively defined by the X and Y axes, and a pair of parallel front and rear surfaces respectively defined by the X and Z axes. During use of the respective light modulators, a modulating signal voltage 30 is applied to the electrode pair 11 and 12 to form an electrostatic field which is spatially periodic in the Z-direction having an intensity proportional to the modulating signal voltage, and which is uniform in the Y-direction subjacent the electrode-bearing surface. A laser beam 20 is coupled into the electrooptic crystal 10 from a front surface thereof. The laser beam 20 propagates in the crystal 10 subjacent the electroe-bearing surface and is totally reflected at that surface at substantially the center position along the length of the crystal in the Y-direction in order that it may travel as long a distance as possible through the portion of the crystal where the effective electrostatic field exists. Thus, modulated output beams, diffracted into orders represented by numerals 21, 22 and 23, emerge from the rear surface of the crystal 10 in accordance with the modulating signal voltage.

The electrooptic light modulator shown in FIG. 2 comprises an input light coupler (not shown) for coupling a laser beam in the thin film 13 as a mode of guided wave propagating in the Y-direction. The substrate 14 of the light waveguide is preferably made from a bulk single electrooptic crystal or flint glass and has three pair of parallel surfaces, similar to the electrooptic crystal 10 of FIG. 1. Further, the thin film 13 is made of a single crystal grown epitaxially on the substrate 14.

During use of the electrooptic light modulator of FIG. 2, a modulating signal voltage 30 is applied to the interdigital electrodes 11 and 12 to form in the thin film 13 an electrostatic field which is spatially periodic in the Z-direction having an intensity proportional to the modulating signal voltage, and which is uniform in the Y-direction. A laser beam 20 is coupled into the thin film 13 of the light waveguide through the input light coupler. The laser beam 20 propagates through the thin film 13 in the Y-direction and undergoes a spatially periodic phase variation in the Z-direction. Thus, modulated output beams, diffracted into orders represented by numerals 21, 22 and 23 emerge from the thin film 13 through an output light coupler (not shown).

In FIG. 4, a graph of the frequency response illustrates the modulation efficiency of the above-mentioned electrooptic light modulators and shows the great variation in modulation efficiency caused by acoustic resonances. In FIG. 5, a portion of the frequency response of FIG. 4 is illustrated on an enlarged scale of coordinates.

In the aforementioned electrooptic light modulators, a high pitched spatially periodic variation in the electric field is produced along the Z-axis when a modulating signal voltage 30 is applied to the interdigital electrodes 11 and 12. To make the modulating signal voltage 30 acceptably small, the pitch of the periodic electric field or the width of the peak electric field is chosen as small as a few tens of micrometers, which corresponds to an acoustic wave frequency ranging from 100 to 350 megahertz. This frequency range can be important where an acoustic surface wave having a propagation vector toward the Z-axis and an acoustic volume wave having a propagation vector in a plane parallel to the X - Z plane surface are excited very efficiently within the frequency spectrum of the modulating signal voltage. If the acoustic surface wave on the electrode-bearing surface returns to its original position with a wavefront that coincides with the original one reflected by edge boundary of the electrode-bearing surface at intersections with a pair of side surfaces, or if the acoustic volume wave returns to its original position with a wavefront coincides with the original one reflected back $2l$ times by the electrode-bearing surface and $2m$ times by the side surfaces, the crystal 10 or the substrate 14 will exhibit an acoustic resonance at these frequencies where the recurring path length is an integral multiple of the acoustic wavelength.

In FIG. 4, it should be noted that the frequency response of the aforementioned light modulators exhibit a large number of rather steep level changes, which are hereinafter referred to as oscillations. The amplitude of these oscillations becomes large at these frequencies indicating by reference numerals 111 and 112. These frequencies are interpreted as those frequencies where two certain types of acoustic waves have wavelengths corresponding to the pitch of the periodic electric field, and thus, such acoustic waves are efficiently excited.

In FIG. 5, it should be noted in detail that the oscillation of the frequency response is a interpreted as periodic occurrence of resonance and anti-resonance. Such periodic occurrences are typical of a long recurring path (specified by $l$ and $m$) becoming an integral $n$ multiple of the acoustic wave length. The frequency spacing between each adjacent point of resonance ($n$ and $n+1$) may be interpreted as the acoustic wave velocity toward the propagation vector specified by ($l, m$) divided by twice the recurring path-length. Such steep changes in the frequency response cause such a serious distortion in the modulating signal that the demodulated signal from a output laser beam is not acceptable from the practical point of view.

SUMMARY OF THE INVENTION

The primary object of the present invention is, therefore, to eliminate the oscillations in the frequency response and thus improve the modulation efficiency so as to obtain a flat response curve which ensures a high fidelity transmission of the modulation signal by the laser beam.

According to the present invention, there is provided an improved electrooptic light modulator which comprises a parallelepiped electrooptic substrate having a first pair of upper and lower surfaces defined by first and second axes of rectangular coordinates, a second pair of side surfaces perpendicular to the first surfaces, and a third pair of front and rear surfaces perpendicular to the first and second surfaces; a set of interdigital electrodes provided on the upper surface to create an electrostatic field in the substrate and subjacent the upper surface, the electrostatic field being spatially periodic along the first axis and uniform along the second axis; means for applying a voltage to the electrodes which is variable in accordance with a modulating signal; and means for coupling into the front portion of the substrate an incident beam of electromagnetic energy having a flat aligned plane along the second axis such that the flat beam propagates in the electrostatic field to emerge from the rear portion of the substrate as modulated output beams; and wherein at least one of the lower surface and the side surfaces is made nonparallel to its opposing surface to prevent resonances from occurring in the acoustic waves produced in the substrate by the electrostatic field.

BRIEF DESCRIPTION OF THE DRAWINGS

Other objects and advantages of the present invention will become more apparent from the description made hereinbelow with respect to preferred embodiments thereof in conjunction with FIGS. 6 to 15 of the accompanying drawings in which:

FIG. 14 is a graph which shows the improved frequency response and modulation efficiency obtained by the present invention, which comprises an ideal flat and smooth frequency response; and FIG. 15 shows a portion of the frequency response shown but on FIG. 14 in an enlarged scale of coordinates.

DESCRIPTION OF THE PREFERRED EMBODIMENTS

Figure 3:
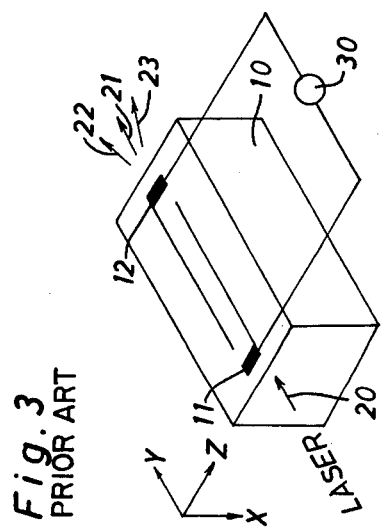
Figure 1:
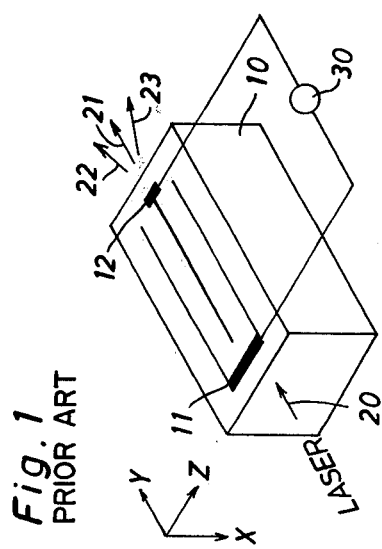
Figure 2:
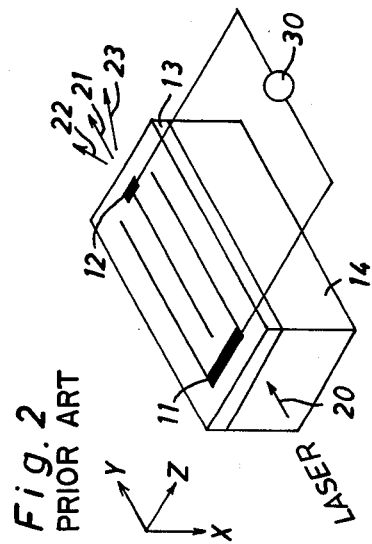

Recalling the origin of the oscillations as explained above, the present invention provides at least three techniques for effectively preventing acoustic resonance of various modes-from occurring in the electrooptic crystal 10 of FIG. 1 or the substrate 14 of FIG. 2.

One technique is to make either the first or the second pair of plane surfaces of the crystal 10 or the substrate 14 or both the first and the second pair of plane surfaces non-parallel by cutting the pair of planes in a wedged shape or fabricating them in a curved or corrugated form. With this first method, the acoustic waves of various propagation vectors will never return to the original position with a wavefront that coincides with the original one.

A second method is to absorb the acoustic waves of various propagation vectors at the Y - Z or Y - X plane surfaces of the crystal 10 or the substrate 14 by an acoustic absorber affixed to the relevant plane surface so that the acoustic waves will never return to their original position. For this method, a low melting point solder and epoxi- or cianoacrylate-resin have been found to be effective as the acoustic absorber.

An alternative and third method is to dissipate the acoustic waves of various propagation vectors out from the electrooptic crystal 10 or the substrate 14 before they return to their original position by providing an acoustic medium having an acoustic impedance closely matched to that of the electrooptic crystal so as to transmit a good portion of the acoustic energy through the first or the second plane surface into the acoustic medium. In this instance, the acoustic medium may be provided with an irregular outside boundary or with an appropriate attenuation constant for the acoustic waves to prevent retransmission of the acoustic waves into the electrooptic crystal through the first or the second plane surface.

Referring now to the drawings, FIGS. 6, 7, 8 and 9 respectively illustrate four embodiments of the present invention wherein the first method is adapted to the case of an electrooptic light modulator previously explained with reference to FIG. 1. In the two embodiments shown in FIGS. 6 and 7, the first pair of plane surfaces defined by the Y and Z axes in each of the electrooptic crystals 10A and 10B is made non-parallel by cutting them in a wedged shape. The wedged plane surface is inclined along the Y-axis in the first embodiment of FIG. 6, whereas it is inclined along the Z-axis in the second embodiment of FIG. 7. In the other two embodiments shown in FIGS. 8 and 9, the second pair of side plane surfaces defined by the X and Y axes in each of the electrooptic crystals 10C and 10D is made non-parallel by cutting them in a wedged shape. The wedged plane surface is inclined along the Y-axis in the third embodiment of FIG. 8, whereas it is inclined along the X-axis in the fourth embodiment of FIG. 9.

Figure 10:
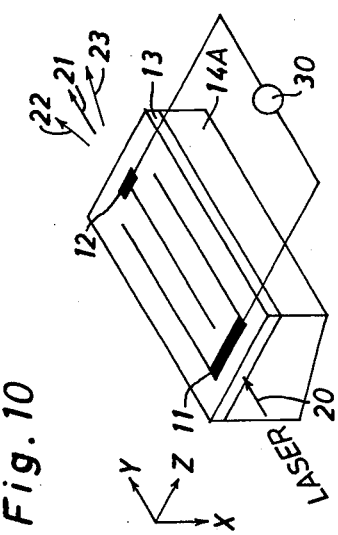
FIGS. 10 and 11 schematically illustrate alternative preferred embodiments of the present invention adapted for use analagous to the electrooptic light modulator illustrated in FIG. 2.
Figure 11:
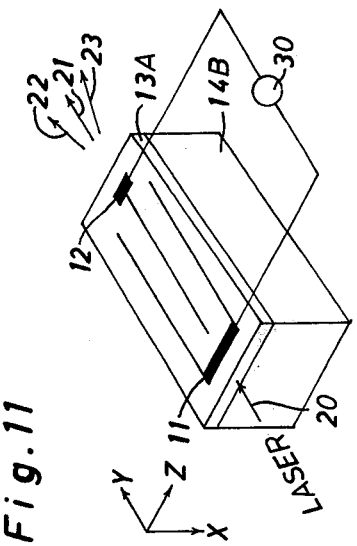

FIGS. 10 and 11 illustrate two alternative embodiments of the present invention wherein the first method is adapted for an electrooptic light modulator previously explained with reference to FIG. 2. In the embodiments shown in FIGS. 10 and 11, the first and the second pair of plane surfaces are made non-parallel respectively, by cutting them in a wedged shape inclined along the Z-axis and the Y-axis, respectively.

In the embodiment shown in FIGS. 6 to 11, almost all of volume wave designated by ($l, m$) never return to their original position but for the surface acoustic wave and volume acoustic wave (1, 0) and (0, 1). Accordingly, almost none of the volume waves resonate. Thus, the amplitude of oscillation in the frequency response reduces from one tenth to one thirtieth of that of the aforementioned light modulator of FIGS. 1 or 2.

Figure 12:
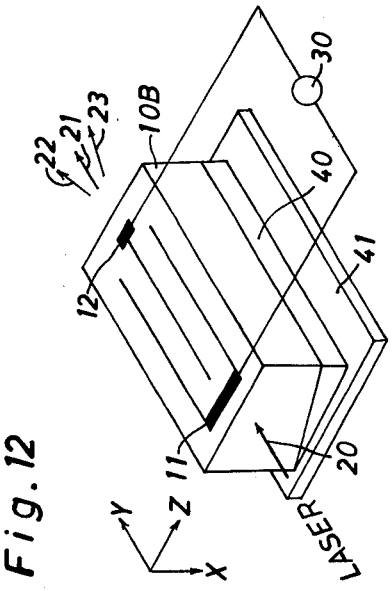
FIGS. 12 and 13 schematically illustrate still alternative preferred embodiments of the present invention which are adapted for use analagous to the electrooptic light modulator illustrated in FIG. 1.

FIG. 12 illustrates yet another embodiment of the present invention in which the first method is adapted for use in combination with the second and the third methods for an electrooptic light modulator previously explained with reference to FIG. 1. In this embodiment, the first pair of plane surfaces of an electrooptic crystal 10B is made non-pararellel by cutting them in a wedged shape inclined along the Z-axis. The electrooptic crystal 10B is adhered along the wedged plane surface thereof to a metallic base plate 41 by using an epoxi-resin 40. With this embodiment, remaining oscillations in the frequency response in the previous embodiment of FIG. 7 will not be interpreted by recurrence of a plane acoustic wave but the higher order resonance mode of wedge in bulk. In this instance, the epoxi-resin layer 40 contributes as an acoustic absorber to attenuate such an acoustic resonance mode. When the epoxi-resin 40 is loaded by metal powder, the acoustic impedance of the compound material approaches that of the electrooptic crystal 10. Such acoustic absorber is more effective in absorbing the acoustic waves. Thus, the amplitude of oscillation in the frequency response reduces from one fiftieth to one hundredth of that of the aforementioned electrooptic light modulator of FIG. 1.

Figure 13:
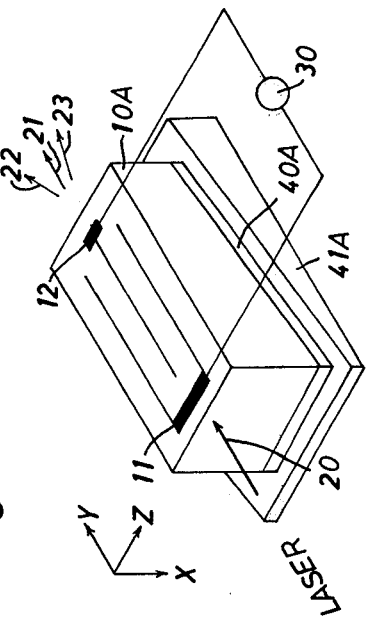

FIG. 13 illustrates yet another embodiment of the present invention in which the first method is applied in combination with the second and the third methods to an electrooptic light modulator of the kind illustrated FIG. 1. In this embodiment, the first pair of plane surfaces of an electrooptic crystal 10A is made non-parallel by cutting them in a wedged shape inclined along the Y-axis. The electrooptic crystal 10A is adhered along the wedged plane surface thereof to a metallic base plate 41A having an acoustic impedance close to that of the crystal 10A by using cianoacrylate-resin 40A. With this embodiment, a good portion of acoustic energy is transmitted through the cianoacrylate-resin layer 40A into the metallic base plate 41A, wherein the acoustic wave is sufficiently attenuated before being retransmitted toward the surface and being reflected back from the other surface of the metallic plate 41A.

Figures 4, 5:
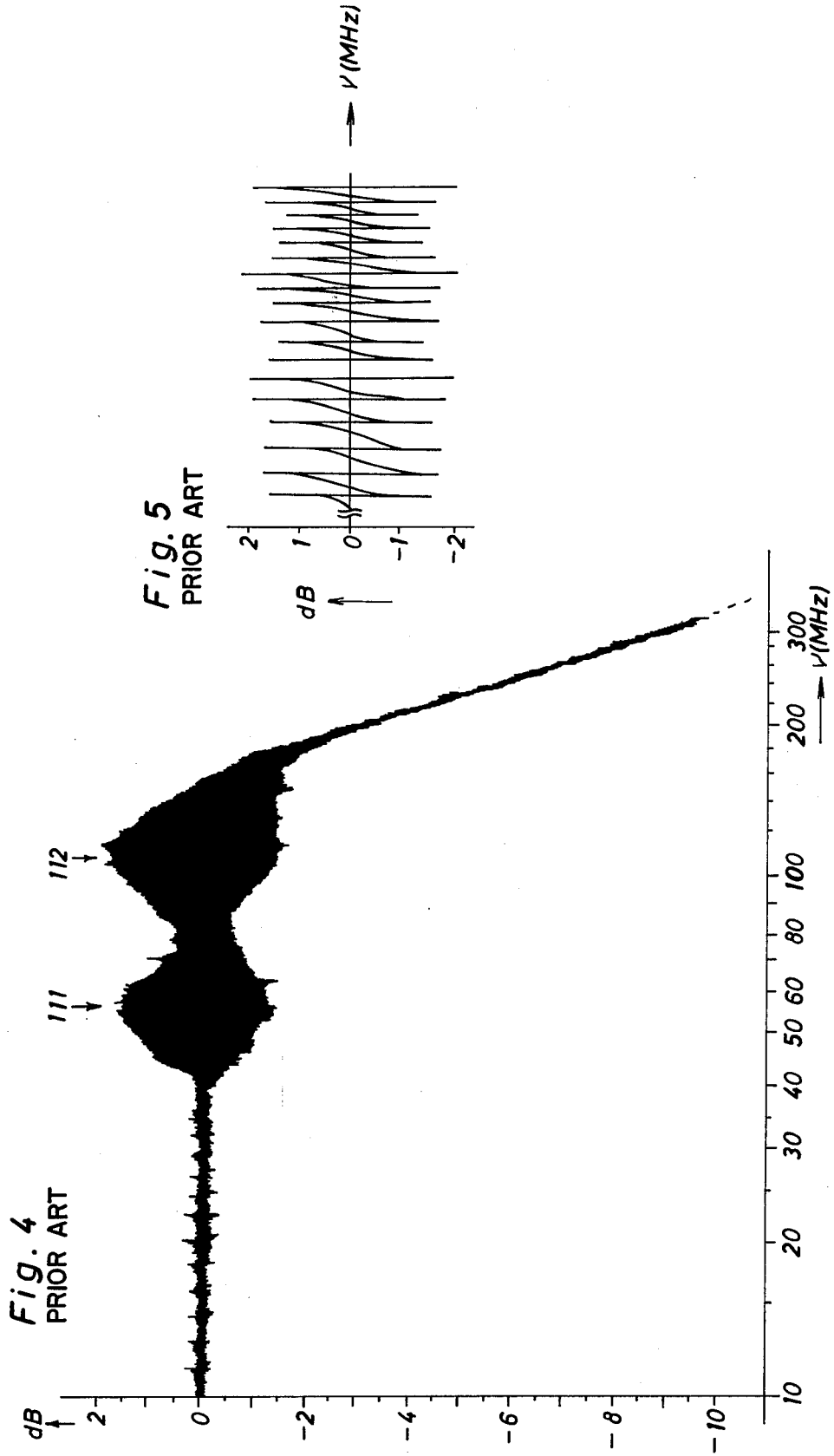
Figure 8:
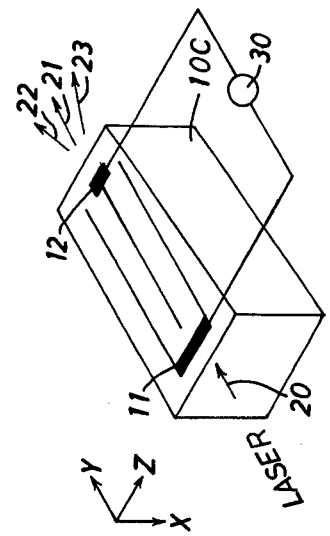
FIGS. 6 to 9 schematically illustrate preferred embodiments of the present invention which are adapted for use in the manner of the electrooptic light modulator illustrated in FIG. 1.
Figure 9:
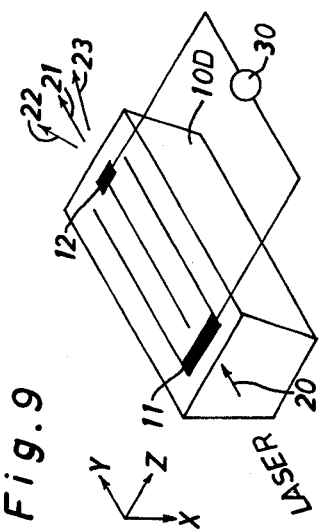
Figure 6:
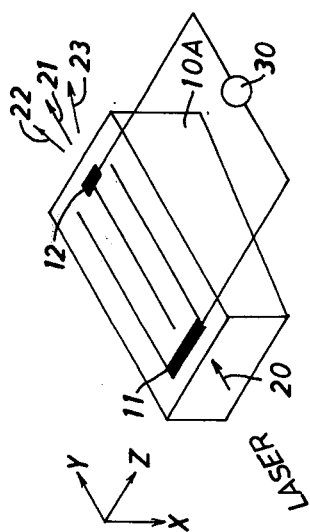
Figure 7:
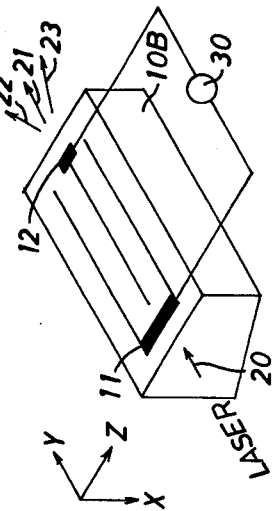

In FIG. 14, there is depicted the improved frequency response of the modulation efficiency obtained by the previous embodiment of FIG. 12, which is seen to exhibit an almost ideal flat and smooth frequency response. FIG. 15 shows the remaining oscillation of the frequency response, which is in fact from one fiftieth to one hundredth of that shown in FIG. 5.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In combination with an electrooptic light modulator comprising:
   an electrooptic substrate having a first pair of opposing upper and lower surfaces defined by first and second rectangular coordinate axes, a second pair of opposing side surfaces, and a third pair of front and rear opposing surfaces;
   interdigital electrodes provided on said upper surface to cause in said substrate and subjacent said upper surface an electrostatic field which is spatially periodic in the direction of said first axis and uniform in the direction of said second axis;
   means to apply to said electrodes a voltage variable in accordance with a modulating signal; and
   the front portion of said substrate adapted to receive an incident beam of electromagnetic energy having a flat aligned plane toward the direction of said second axis such that said flat beam propagates in the electrostatic field to emerge from said rear surface as modulated output beams;
   the improvement wherein at least one of said lower surface and said side surfaces is non-parallel with the opposing surface thereto to prevent resonances of acoustic waves produced in said substrate by the electrostatic field.

2. An electrooptic light modulator as claimed in claim 1, wherein said non-parallel surface of said substrate comprises an inclined plane surface.

3. An electrooptic light modulator as claimed in claim 1, wherein said non-parallel surface of said substrate comprises a curved surface.

4. An electrooptic light modulator as claimed in claim 1, wherein said non-parallel surface of said substrate comprises a corrugated surface.

5. An electrooptic light modulator as claimed in claim 1, wherein an acoustic absorber is provided on said non-parallel surface of said substrate to absorb the acoustic waves of various propagation vectors.

6. An electrooptic light modulator as claimed in claim 5, wherein said acoustic absorber comprises a low melting point solder.

7. An electrooptic light modulator as claimed in claim 5, wherein said acoustic absorber comprises an epoxi-resin layer.

8. An electrooptic light modulator as claimed in claim 5, wherein said acoustic absorber comprises a cianoacrylate-resin layer.

9. An electrooptic light modulator as claimed in claim 1, wherein said non-parallel surface of said substrate is provided thereon with an acoustic impedance which is substantially the same as that of said electrooptic substrate to dissipate the acoustic waves of various propagation vectors from said substrate.

10. An electrooptic light modulator as claimed in claim 1, wherein said electrooptic substrate is affixed at said non-parallel surface thereon to an acoustic medium by an epoxi-resin, said acoustic medium having an acoustic impedance close to that of said substrate.

11. An electrooptic light modulator as claimed in claim 10, wherein said acoustic medium comprises a metallic plate having an acoustic impedance close to that of said substrate.

12. In combination with an electrooptic light modulator comprising:
   an electrooptic crystalline medium having a first pair of upper and lower surfaces defined by first and second rectangular coordinate axes, a second pair of side surfaces, and a third pair of front and rear surfaces;
   interdigital electrodes provided on said upper surface to cause in said medium and subjacent said upper surface an electrostatic field which is spatially periodic in the direction of said first axis and uniform in the direction of said second axis;
   means to apply to said electrodes a voltage variable in accordance with a modulating signal; and
   said front surface of said medium adapted to receive an incident beam of electromagnetic energy having a flat aligned plane along the direction of said second axis and in such an angle range that said beam propagates in said medium so as to be totally reflected on the inside of said upper surface, said medium delivering modulated output beams from said rear surface;

the improvement wherein at least one of said bottom surface and said side surfaces is non-parallel with the opposing surface thereto to prevent resonances of acoustic waves produced in said medium by the electrostatic field.

13. In combination with an electrooptic light modulator comprising:

a light waveguide comprising an electrooptic crystalline composite structure including a substrate having a first pair of upper and bottom surfaces defined by first and second rectangular coordinate axes, a second pair of side surfaces, a third pair of front and rear surfaces, and a light transmissible thin-film deposited on said upper surface of the substrate;

a light source emitting an incident beam of electromagnetic energy;

said thin-film adapted to receive said beam as a mode of guided wave propagating in the direction of said first axis;

interdigital electrodes provided on said light waveguide to cause therein an electrostatic field which has spatial periodicity in the direction of said second axis and which is uniform in the direction of said first axis;

a voltage source connected to said electrodes to apply thereto a modulating signal voltage; and the propagated light wave emitted from said waveguide being diffracted into orders;

the improvement wherein at least one of said bottom surface and said side surfaces is non-parallel with the opposing surface thereto to prevent resonances of acoustic waves produced in said substrate by the electrostatic field.

* * * * *